(12) United States Patent
Schwartz

(10) Patent No.: US 7,938,423 B2
(45) Date of Patent: May 10, 2011

(54) EXERCISE CYCLE

(76) Inventor: Leroy Schwartz, Swift Current (CA)

( * ) Notice: Subject to any disclaimer, the term of this patent is extended or adjusted under 35 U.S.C. 154(b) by 75 days.

(21) Appl. No.: 12/499,935

(22) Filed: Jul. 9, 2009

(65) Prior Publication Data

US 2010/0009814 A1 Jan. 14, 2010

Related U.S. Application Data

(60) Provisional application No. 61/079,149, filed on Jul. 9, 2008.

(51) Int. Cl.
*B62M 1/14* (2006.01)
(52) U.S. Cl. ....................................................... 280/282
(58) Field of Classification Search ....... 280/242.1–250, 280/282
See application file for complete search history.

(56) References Cited

U.S. PATENT DOCUMENTS

| | | | |
|---|---|---|---|
| 6,193,253 B1* | 2/2001 | Barnett | 280/234 |
| 7,237,786 B2* | 7/2007 | Montez | 280/240 |
| 2008/0129007 A1* | 6/2008 | Lee | 280/242.1 |

* cited by examiner

*Primary Examiner* — Kevin Hurley
(74) *Attorney, Agent, or Firm* — Dardi & Herbert, PLLC

(57) ABSTRACT

An exercise cycle and a method of using the exercise cycle, in which motion from the user's twisting of the torso and alternate pushing on hand grips are transmitted to the driving shaft for movement of the cycle. The exercise cycle comprises a frame, a front wheel, a first rear wheel, a second rear wheel, a seat, operator handles, hand grips, foot force plates, and a driving device. The driving device consists of a driving shaft, a force plate, pivotal arms, an elongate member, and a disk. The input of the user by torso twisting movement or pushing on handgrips will cause the cycle to move forward or backward.

14 Claims, 4 Drawing Sheets

EXERCISE CYCLE

CROSS REFERENCE TO RELATED APPLICATIONS

This patent application claims priority to U.S. provisional patent application Ser. No. 61/079,149 filed Jul. 9, 2008, which is hereby incorporated by reference herein.

TECHNICAL FIELD

The technical field relates to human powered wheeled vehicles, and more specifically to such wheeled vehicles which are physically driven by a user using their upper body.

BACKGROUND

A cycle, and in particular a bicycle, is a human-powered wheeled vehicle that can be ridden for recreation, exercise, sport or transportation. Cycling occurs when a user pedals with their feet in order to move a chain, which rotates a rear wheel so as to drive the bicycle forward. The direction of the bike is controlled by the user's hands on handlebars, controlling the orientation of the front wheel and thereby allowing the user to steer the cycle with their hands and arms.

Cycling allows one to enjoy the outdoors while getting exercise. It also provides for a sustainable mode of transport. Cycling provides the potential for energy and resource conservation and health benefits as compared to motorized forms of transport.

The physiological benefits of cycling are well-known. Cycling can improve fitness and cardiovascular health, as well as strengthen the lungs. The repetitive motion of pedaling a bicycle, with the user alternately using her legs to rotate the pedals and thereby drive the wheels also has a substantial benefit to the rider's musculature in their legs and feet. However, while cycling may have significant benefits for a rider's leg strength and conditioning, it does little or nothing for the muscles in the rider's upper body beyond some ancillary benefits that are the result of merely sitting upright, steering, bracing their body, and balancing.

More recently, exercise regimes such as pilates and yoga have begun focusing on core postural muscle exercises to develop and strengthen the upper body. This newfound focus is a logical result of the growing interest in the development of core postural muscles. Core postural muscles are not only the abdominal muscles but also consist of a number different muscles running along the entire length of a person's torso that are used to stabilize a person's spine, pelvis and shoulders. These "core" muscles serve to form a stable and solid platform for a person's movements of their arms and legs. Strong core muscles have the additional benefits of allowing for controlled movements of the body, the transfer of energy, the shifting of body weight, and movement in every direction. Additionally, core muscles act to protect the back and distribute weight-bearing burden of the torso. Strong core muscles are furthermore essential to allowing a person to stand upright and to move on their feet. Core muscle stability confers to the body a stable foundation and allows the body to transfer energy from the core of the body out to the extremities. There are therefore numerous benefits to a person having a strong foundation of core muscles.

With the growing popularity in core postural muscle exercises, such as those focused on in pilates exercises, it would be beneficial to have a cycle that focused on and developed those core postural muscles. Core postural muscles help keep the body balanced and provide essential support for the spine. It is also desirable to develop those muscles for aesthetic purposes, giving the waist a slim and toned appearance.

While traditional bicycles are great for leg strength, they provide little in the way of conditioning or strengthening of core postural muscles in the torso. Stationary exercise machines are available that condition these core postural muscles, however these exercises do not provide a way to enjoy these exercises outdoors while being propelled on a human-powered wheeled vehicle. It is desirable to combine the transportability, the potential for energy and resource conservation, and the health benefits for the heart and lungs associated with the use of a conventional bicycle, with a means for strengthening the core muscles of the rider at the same time.

SUMMARY OF THE INVENTION

It is an object of the present invention to provide a human powered wheeled vehicle or exercise cycle that uses the core muscles of a writer to power the vehicle.

It is a further object of the present invention to provide an exercise cycle which can be powered in a forward or rear were direction by the upper body of the operator and more specifically by torso-based movement. The invention accomplishes its goals by having a drive conversion device which is used to convert forward and backward rotational motion generated from torso movements of the operator into a movement which is used to drive the wheels of the cycle and to initiate or power travel thereof.

The exercise cycle of the present invention at its core includes a cycle frame with a seat. In addition to a frame and a seat, the cycle also includes a front wheel and at least two rear wheels, each of which are rotatably connected to the cycle frame. There is a force plate which is positioned below the seat and which is rotatably attached along its base to the cycle frame, approximately along the frame centerline in such a way that the force plate can be rotated around its point of attachment to the cycle frame and it will rotate approximately perpendicular to the frame and the frame centerline.

Two operator handles are attached to the force plate. Each operator handle has an attachment and in the distal end, where the attachment and is attached to the force plate on opposing sides thereof in such a way that when the distal ends of the operator handles which extend upwards past the seat are pushed front words or pulled backwards in relation to the direction of travel of the cycle by the operator seated on the seat, the operator handles will move in opposition to each other and will occasion the rotation of the force plate.

The key to the invention is the drive conversion device which connects the force plate to at least one of the rear wheels. The drive conversion device could take many different mechanical forms but is specifically contemplated to be a drive shaft which is rotatably or pivotally attached to the force plate at one end and to at least one of the rear wheels either directly or by way of another disk or plates mounted inside of the wheel. The drive conversion device will basically allow for the conversion of the frontward and rearward motion of the force plate into rotational force which can be exerted upon the wheels of the cycle to result in driving power forward or reverse.

Upon movement of the operator handles, the operator will exert a rotational force upon the force plate which will be converted by the drive conversion device and applied to the rear wheel of the cycle resulting in the forward or rear were driving up the cycle by the frontward and rearward movement of the operator handles.

The operator handles could be made adjustable in length to allow for customization of their use for different sized operators of the cycle. As well, the operator handles could be fixedly attached to the force plate or could be attached in a way that they could be pivoted out from the force plate in a way so as to allow for expansion of the spacing between the operator handles around the seat.

One way of making the spacing between the operator handles around the seat adjustable is to pivotally attach the operator handles of their attachment ends to the opposing edges of the force plate and then to use an adjustable length pivot arm to attach each operator handle a point above the attachment and to a point along the edge of the force plate such that by adjusting the length of the pivot arm in question the spacing of the operator handle from the seat will be expanded or contracted.

The drive conversion device which is used to convert the forward and backward motion of the force plate for application to power the rear wheels of the cycle could take many forms but is contemplated explicitly herein to be a driveshaft pivotally attached to the force plate and to at least one of the rear wheels in such a way as to basically exert an eccentric cranking force on the rearward wheel of the cycle when the forward or rearward motion of the force plate is initiated, and creates a pushing or pulling force on the driveshaft. The driveshaft could be adjustable in length if necessary to allow for fine tuning of the operation of the cycle. The point of attachment of the drive shaft to the force plate might also be made adjustable to allow for adjustment to the force of the stroke of the driveshaft.

Attachment of a foot force plate or pedal to the front wheel, and a pivotal attachment of the front wheel to the cycle, will allow for the operator to steer the cycle during motion.

Handgrips could be included on the operator handles. These could be cushioned and/or adjusted or configured in various ways dependent upon the desire or needs of the operator or the manufacturer.

To use the present invention cycle, the user sits in a seat and grasps two hand grips. By pushing alternately on the hand grips, the cycle can be moved forward or reverse with the use of a drive shaft for transmitting the reciprocating movement of the user's abdominal muscles into the rotational movement of the driving wheel such that the vehicle can be propelled by the abdominal movement of the user. The alternate pushing of the hand grips gives a great workout to the core of the body, exercising the complete waist area, front, and sides.

The present invention cycle is steered using the users' feet on the foot force plates. The foot force plates turn the front fork and the front wheel relative to the frame of the cycle, allowing the user to steer the cycle with the user's feet. Substantially only the abdominal muscles are used to propel the vehicle thus providing conditioning for that specific group of muscles.

The present invention provides an exercise system particularly suited for strengthening the abdominal muscles of the user. The present invention combines the benefits of conditioning the abdominal muscles with the enjoyable leisure activity of propelling oneself on a wheeled vehicle.

The present invention cycle is designed so that a person can propel the cycle forward by means of twisting the torso thus working the complete waist area of the human body.

Unlike a stationary exercise cycle, the present invention can be used indoors and outdoors on paths and in parks.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

As outlined above, the invention is an exercise cycle which allows an individual to effectively propel themselves forward on the cycle device using the rotational motion of a torso twist. This will allow for torso exercise as well as at the same time providing a means of locomotion. It is contemplated that an operator sitting on the seat of the cycle can buy twisting their torso from side to side and using their hands to exert force upon to operator handles with this motion, exert force which can be converted to rotational driving force on the wheels of the cycle.

Figure 1:
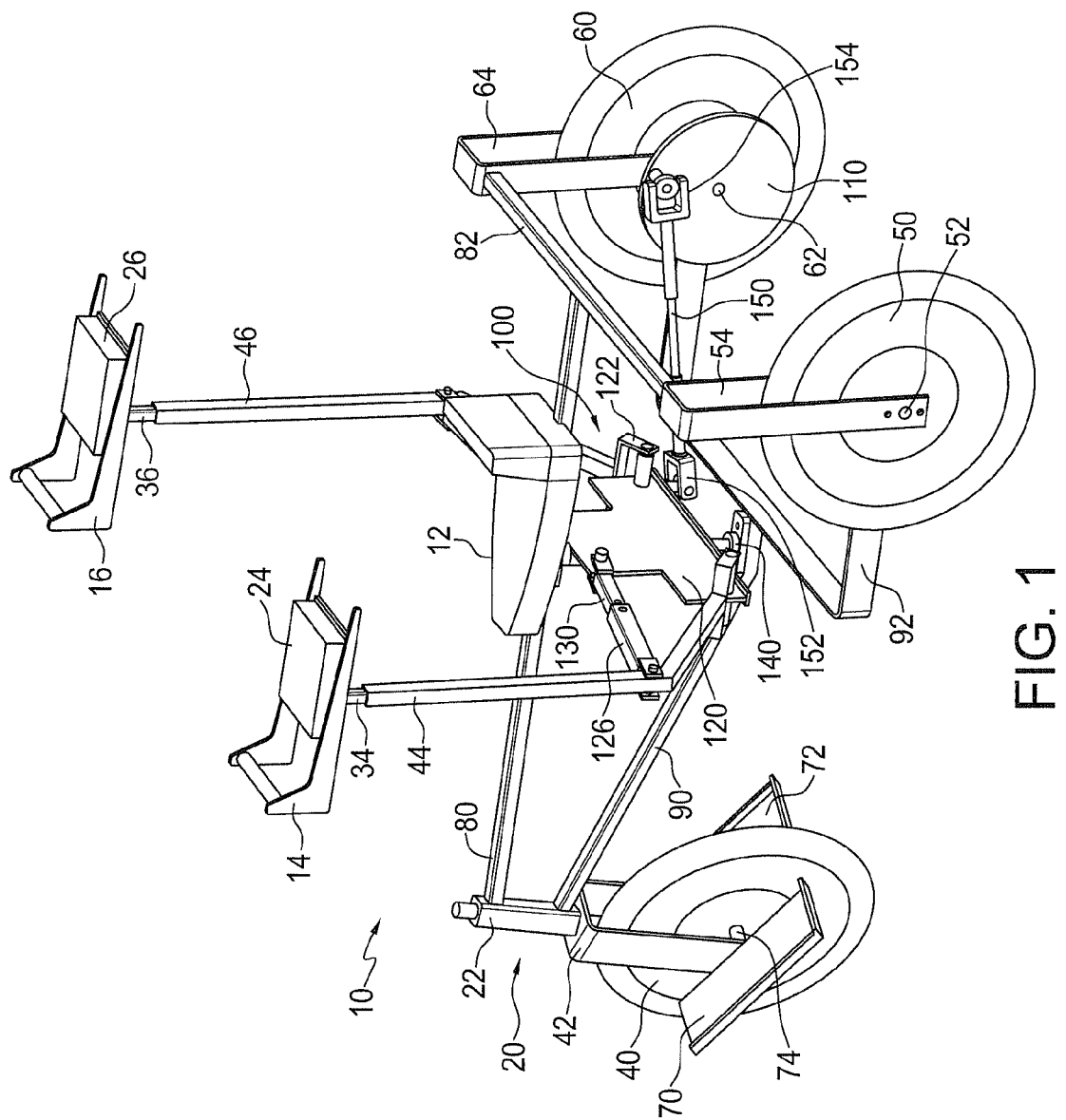
FIG. 1 is a side perspective view of an exercise cycle in an aspect of the invention.
Figure 2:
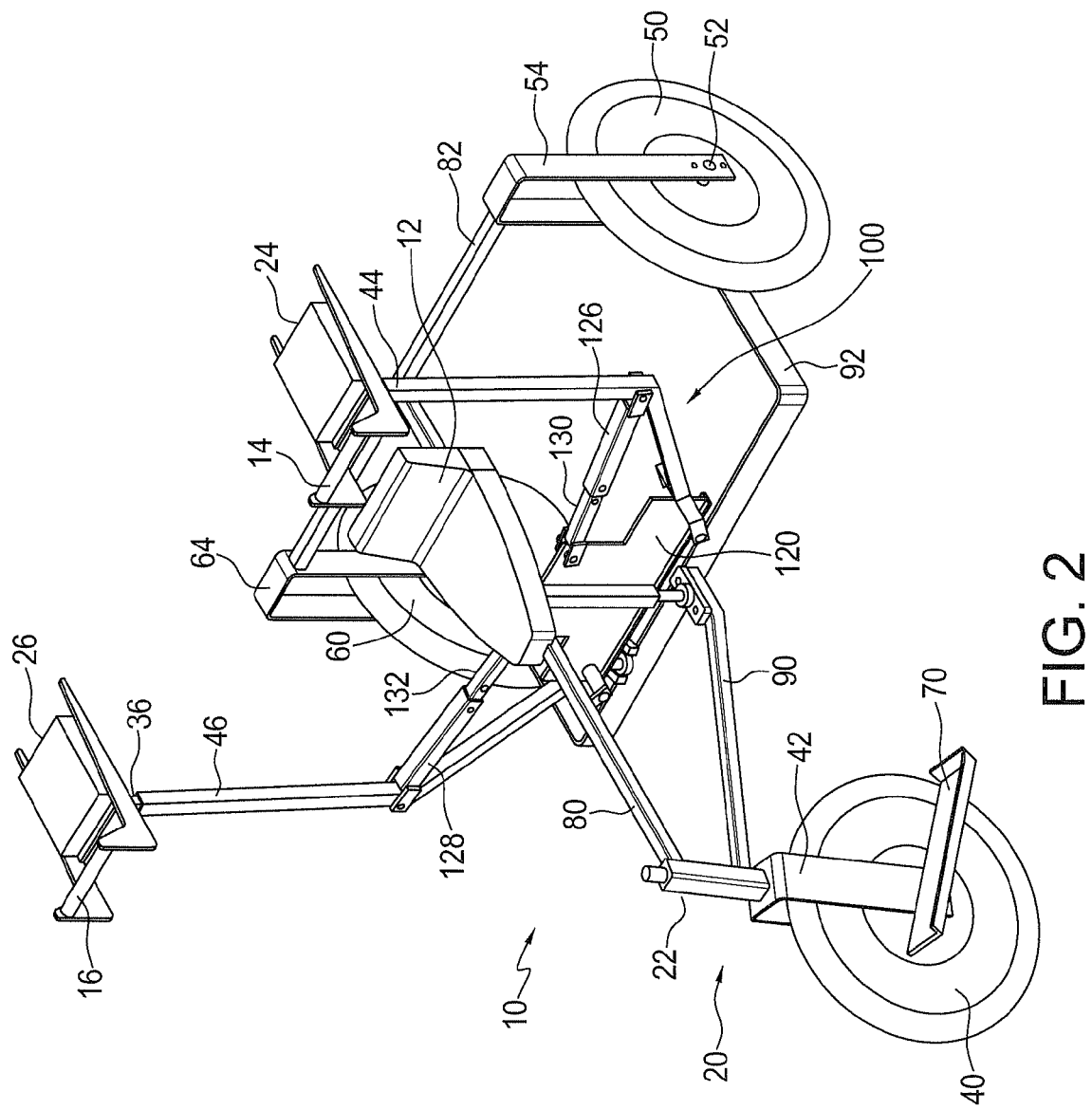
FIG. 2 is top perspective view of the exercise cycle shown in FIG. 1.
Figure 3:
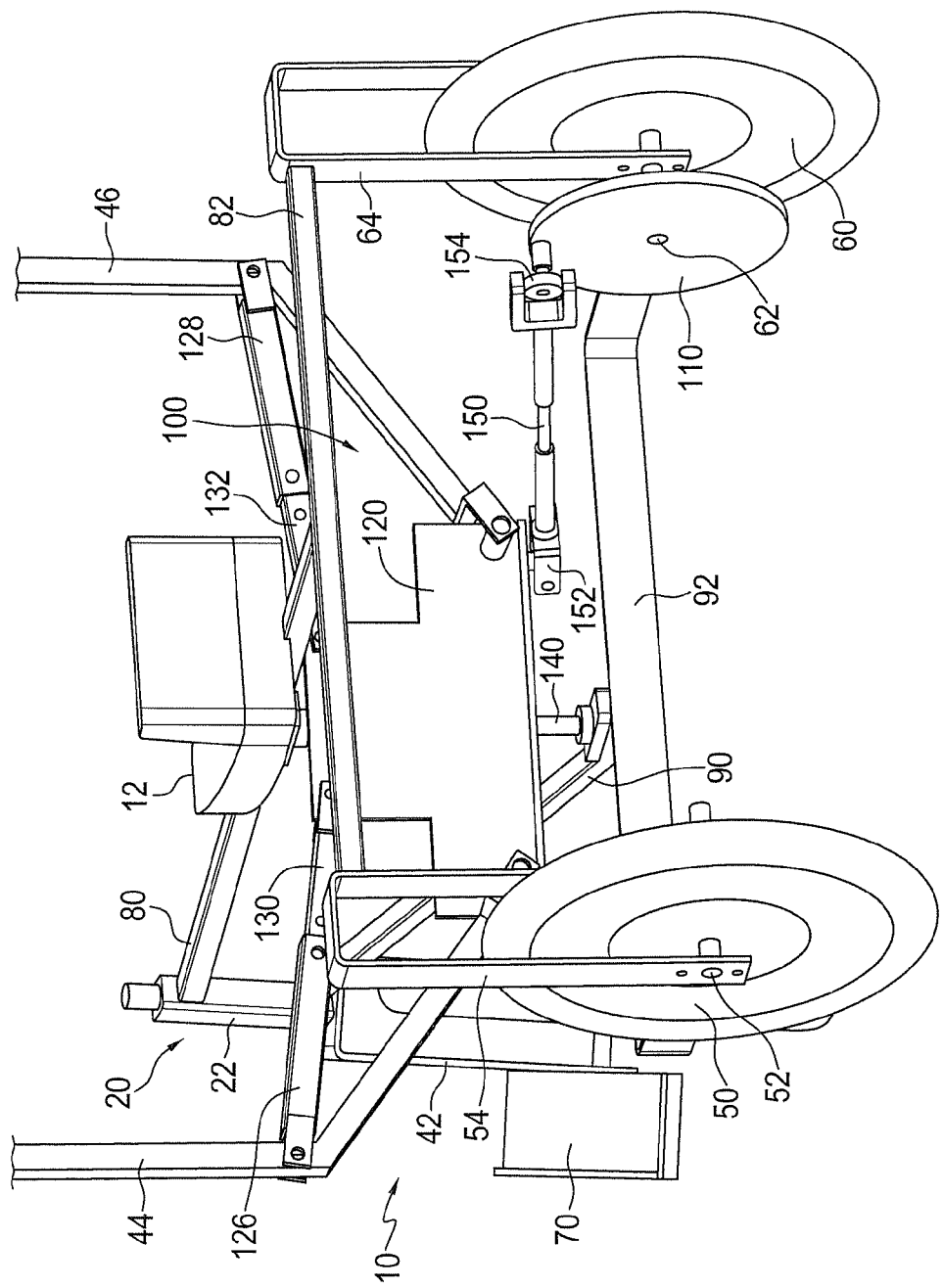
FIG. 3 is a rear perspective view of the lower portion of the exercise cycle shown in FIG. 1.
Figure 4:
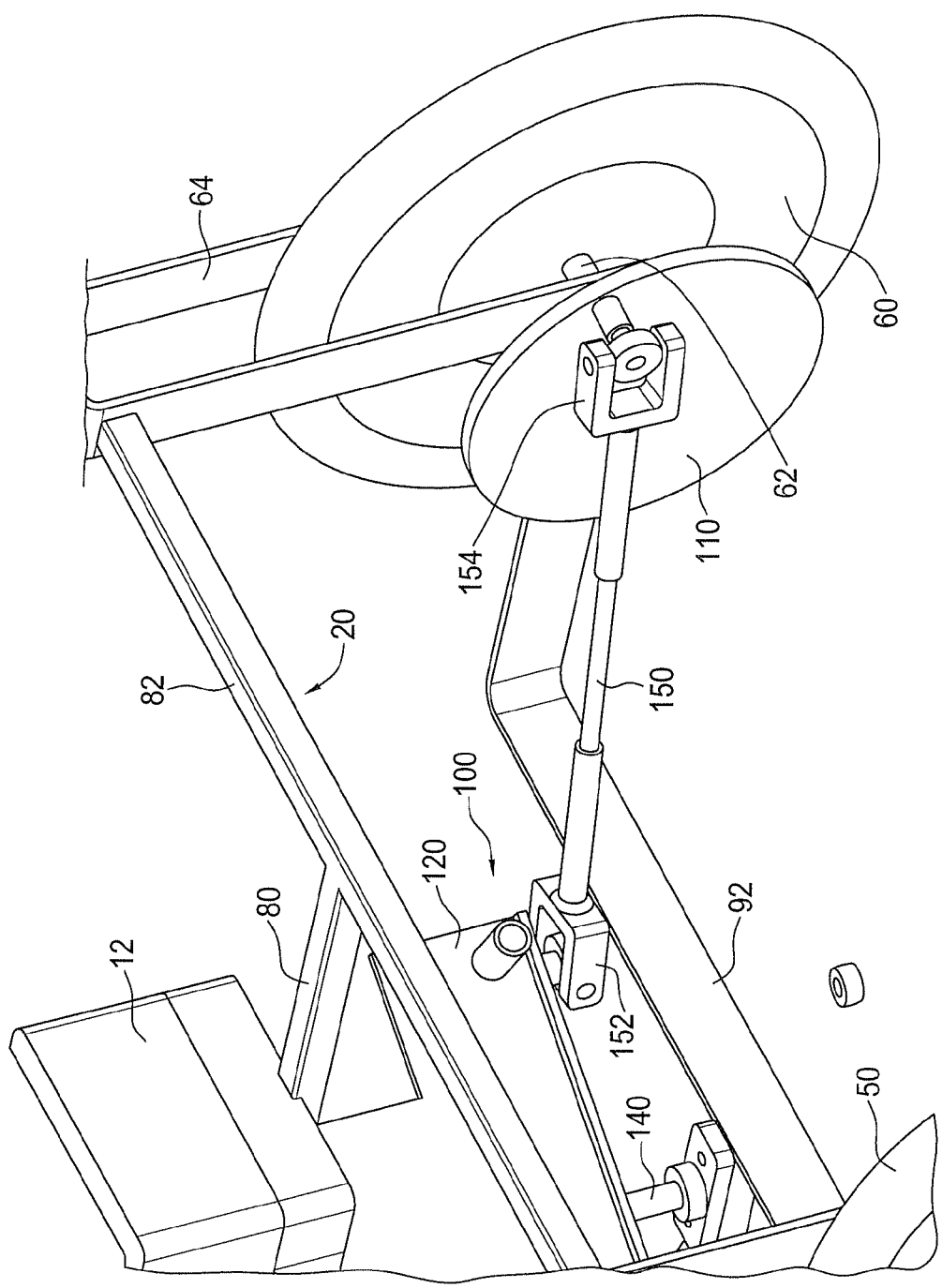
FIG. 4 is a perspective view of the elongate member of the exercise cycle shown in FIG. 1.

FIG. 1 and FIG. 2 illustrate one embodiment of the exercise cycle of the present invention. The exercise cycle 10 includes a cycle frame 20, a front wheel 40, and two rear wheels 50 and 60. It will be understood to those skilled in the art that a different number of front or rear wheels could be used in the cycle of the present invention without departing from the scope or intention hereof. Any modification to the number of wheels used either as front wheels or rear wheels on a cycle in accordance with the remainder hereof is contemplated within the scope of the present invention. Obviously in certain circumstances such as an increase in the number of front wheels, there would be other attendant modifications required to the remainder of the cycle apparatus again insofar as those were obvious to one skilled in the art to make the adaptation to the number of wheels on the cycle those again are contemplated within the scope hereof.

A seat 12 is shown. For the purpose of reference, there is a frame center line which runs from the front to the rear of the cycle 10 and the cycle frame 20, effectively in the straight direction of travel of the cycle 10.

In terms of the specifics of the mounting of the front wheel to the embodiment of the invention demonstrated in these Figures, the frame 20 has a head tube 22 fitted around a front fork 42 providing a rotatable interface between the front fork 42 and the frame 20. The front fork 42 is attached to foot force plates 70 and 72 positioned one on each side of front wheel 40. The front wheel 40 is rotatably mounted to the cycle frame 20 in such a way that it can rotate as the cycle 10 moves forward or backwards, and with the remainder of the attachment and foot force plates 70 and 72 demonstrated in these Figures, the front wheel 40 can also be used to steer the cycle 10 by the operator, seated in the seat 12, exerting foot force on the foot force plates 70 and 72.

Also demonstrated in these Figures is the attachment of the two rear wheels 50 and 60 to the cycle frame 20. Upper tube 80 is attached to crossbar 82. Crossbar 82 is attached at one end to a first rear fork 54 and at a second end to second rear fork 64. Lower tube 90 is attached to lower fork 92. One end of lower fork 92 is attached to the inner side of first rear fork 54. The other end of lower fork 92 is attached to the inner side of second rear fork 64. First rear wheel 50 is positioned in first rear fork 54, to rotate freely around first rear shaft 52. Second rear wheel 60 is positioned in second rear fork 64. The first rear wheel 50 and the second rear wheel 60 are in this way rotatably attached to the cycle frame 20 such that they can rotate as the cycle 10 is moved forward or back.

The next key elements of the invention which is demonstrated in these Figures is the force plate 120 which is situated below the seat 12 and is rotatably attached to the cycle frame 20 along its bottom edge at a point along the frame center line, such that if it were rotated freely, the force plate 120 would rotate freely in a circle around its point of attachment to the cycle frame 20. Positioning of the force plate 120 in relation to the seat 12 would be a design decision to be made by the manufacturer in terms of where specifically they wanted to locate the force plate 120 and the operator handles which are attached thereto, in relation to the operator of the cycle, and the specific relative location of the force plate 120 along the cycle frame 20 below the seat 12 is all contemplated within the scope of the present invention.

In addition to its bottom edge along which it would be attached to the cycle frame 20, the force plate 120 would have a top edge below the seat 12, and two sides which become relevant as points of attachment for additional key elements hereof.

Also shown are two operator handles 44 and 46, each of which has an attachment end and a distal end. Each of the operator handles 44 and 46 would be attached at its attachment end to the force plate 120 along one of its edges below the seat 12. The key spatial relationship and configuration of the attachment of these operator handles 44 and 46 to the force plate 120 is that they be attached from their attachment ends, with the distal ends extending upwards past the seat 12 in such a way that when the distal ends of the operator handles 44 and 46 are moved forward or backwards in relation to the seat 12, the force plate 120 is caused to rotate around its point of attachment to the cycle frame 20.

The operator handles 44 and 46 could be fixedly attached to the force plate 120, not shown, or as in the embodiments demonstrated herein could also be attached in a way that would accommodate user configuration or customization of the cycle 10 based upon the size or height of the operator. Fixed attachment of the operator handles to the force plate is explicitly contemplated within the scope hereof.

In the embodiments demonstrated in the Figures submitted here with, the method of attachment of the operator handles 44 and 46 to the force plate 120 is a bit more elaborate to accommodate customization options for the user. The operator handles 44 and 46 are each capably attached, at their points of attachment to the opposing edges of the force plate 120, so that they would be able to rotate upward and downward in the same vertical plane as the force plate. There are then shown two additional components, being to pivot arms 126 and 128 which are each adjustable in length and are each pivotally attached at one end thereof to the force plate 120 and at the other end thereof to one of the operator handles 44 and 46, whereby upon adjusting the length of the pivot arm or arms 126 and 128, the spacing of the operator handles 44 and 46 from the seat 12 is adjusted. Various types of adjustable length pivot arms 126 and 128 can be contemplated, including telescoping or threaded arms etc. and all such modifications will be understood by one skilled in the art of manufacturer of this type of equipment and are contemplated within the scope of the present invention.

The operator handles 44 and 46 might either be a fixed length, or could be made adjustable in length again to accommodate different sizes of operators of the cycle 10. The operator handles 44 and 46 which are shown in these Figures telescope to allow for vertical adjustment. Either fixed length operator handles, or operator handles which are adjustable in length, are both contemplated within the scope of the present invention.

The operator handles 44 and 46 might either simply consist of vertical shaft which could be gripped by the user at the distal ends thereof in operation of the cycle 10, or as is shown in the Figures here with, the operator handles 44 and 46 could include handgrips 14 and 16 at their distal ends. The handgrips 14 and 16 could take various shapes or configurations dependent upon the desired grip or operator comfort and all such handgrips are contemplated within the scope of the present invention.

So far what we have laid out here then is the general cycle frame 20, with the force plate 120 mounted below the seat 12 in such a way that's when an operator is seated on the seat 12, they can push or pull the operator handles 44 and 46 forward or backwards and this will result in a rotation of the force plate 120 in a plane perpendicular to the cycle frame 20, approximately along the centerline of the frame, since the force plate 120 will be attached to rotatably to the cycle frame 20 along its centerline.

Key to the concept of the present invention however is the next element to be discussed, namely the drive conversion device 100 which is used to connect the force plate 120 to at least one of the rear wheels 50 and 60 in a way that the forward and backward motion exerted by the user upon the operator handles 44 and 46 can be converted into the rotational force to be applied to the rear wheels 50 or 60 cycle 10 and allow for driving the cycle 10 forward or backward based upon operator movement of the operator handles 44 and 46. The drive conversion device 100 might take a number of different forms, and any drive conversion device which had the desired effect of converting the rotational movement of the force plate 120 around its point of attachment to the cycle frame 20 into rotational force which could be used to drive at least one of the rear wheels of the cycle 10 forward or backward is contemplated within the scope of the present invention.

Referring to FIGS. 1 through 4, the drive conversion device 100 which is shown here in includes a driveshaft 150 which is pivotally connected at one end thereof to the force plate 120 and is pivotally connected at the opposite end thereof, being the drive in a driveshaft 150, to at least one of the rear wheels. The pivotal attachment of the driveshaft 150 to the force plate 120 and the rear drive wheel is key to the present invention. The specifics of the method of attachment could vary depending upon means of manufacture and it will be understood that the key aspect of this particular drive conversion device 100 is that the driveshaft 150 is attached in such a way that as the driveshaft 150 is pulled forward by the rotational movement of the force plate, in relation to the direction of travel of the cycle 10, the driveshaft 150 through its pivotal but fixed attachment to at least one of the rear wheels 50 or 60 will effectively pull forward, from its point of rotational attachment to that rear wheel, on the rear wheel to which it is attached at its drive end and effectively an eccentric driving force will be applied to the rear wheel to which the driveshaft 150 is attached, as the operator handles 44 and 46 are moved forward and backward by the operator.

While it is explicitly contemplated that many embodiments of the cycle 10 of the present invention could move both forward and backward, it is also contemplated that the inclusion of a clutch on the rear wheel which was being driven by the driveshaft such that only one direction of motion of the driveshaft would result in the application of driving force to the rear wheel and the other would be released by the clutch could be manufactured. One of the shortcomings to a device incorporating a clutch such as this would be that it could only move in one direction i.e. forward likely, but it may be the case that in certain circumstances either the manufacture or configuration of the device or its operation may be more desirable in that circumstance. Embodiments of the exercise cycle 10 of the present invention both with or without such a clutch are contemplated within the scope of the present invention.

The driveshaft 150 could be attached directly to the rear wheel in question, or as shown in these Figures the driveshaft 150 is attached to a disk 110 inside of the wheel. The driveshaft 150 might be adjustable in length, to allow for configuration or adjustment of the device as in the embodiment that did not include a clutch of any kind on the drive wheel, it would be necessary to basically adjust either the length of the driveshaft 150 or perhaps the stroke of the driveshaft 150 even by slidably adjusting for example the attachment of the driveshaft 150 along the edge of the force plate 120, so that effectively the stroke which was provided by the driveshaft 150 would be enough to cause a full half rotation of the drive wheel.

In operation, a user (not shown) sits on the seat 12 of the exercise cycle 10. The user then places her feet in the foot force plates 72 and 74 and grasps the hand grips 14 and 16 with her hands. The user can then propel the exercise cycle 10 by moving hand grips 14 and 16 forward and backward relative to each other. While hand grip 14 moves in the forward direction, hand grip 16 will move in the backward direction and vice versa. The driving shaft 150 rotates in direct relation to the alternating pivotal motion of hand grips 14 and 16, and therefore operator handles 44 and 46 to which the hand grips 14 and 16 are attached, due to user input, thereby cause the sides of force plate 120 connected to the driving shaft 150 to move forward and backward relative to each other. This forward and backward motion of the sides of force plate 120 relative to each other forces the drive shaft 150 connected to the force plate 120 to move which will then rotate the disk 110, which will in turn start the second wheel 60 rotating causing the exercise cycle 10 to begin to move. The user will continue to move the exercise cycle 10 by moving the hand grips 14 and 16 back and forth.

In this way, the motion from the user's twisting of the torso and alternate pushing on hand grips 14 and 16 is transmitted to the driving shaft 150, which acts as a lever converting torque to mechanical force for movement of the drive shaft 150. The forward and backward motion of drive shaft 150 causes rotation of disk 110, and in turn, rotation of second rear wheel 60, which drives the cycle forward.

The drive conversion device 100 allows the present invention cycle to move forward or backward depending on input from the user. The motion the drive shaft 150 receives from the input of the user will cause the drive shaft 150 to move forward or backward to drive the disk 110 into a forward motion or a backward motion, thereby forcing the second rear wheel 60 to rotate causing the exercise cycle 10 to move forward or backward accordingly.

In order to move the exercise cycle 10 forward, the user pushes hand grip 16, closest to disk 110, forward while pulling hand grip 14 backward if the second end 154 of drive shaft 150 is on the top arc of the path taken by the second end 154 of drive shaft 150 in a full revolution of the disk 110. If the second end 154 of drive shaft 150 is on the bottom arc of the path taken by the second end 154 of drive shaft 150 in a full revolution of the disk 110, the user moves the exercise cycle forward by pulling hand grip 16, closest to disk 110, backward while pushing hand grip 14 forward. These motions will force the second end 154 of the drive shaft 150 to move in a counter-clockwise direction when looking at the disk 110 on the side attached to the second end 154 of the drive shaft 150. The counter-clockwise revolution of the second end 154 of the drive shaft 150 will cause the disk 110, and therefore the second rear wheel 60, to rotate in a counter-clockwise direction, moving the exercise cycle 10 in a forward direction.

Similarly, in order to move the exercise cycle 10 backward, the user pushes hand grip 16, closest to disk 110, forward while pulling hand grip 14 backward when the second end 154 of drive shaft 150 is on the bottom arc of the path taken by the second end 154 of drive shaft 150 in a full revolution of the disk 110. When the second end 154 of drive shaft 150 is on the top arc of the path taken by the second end 154 of drive shaft 150 in a full revolution of the disk 110, the user moves the exercise cycle 10 forward by pulling hand grip 16, closest to disk 110, backward while pushing hand grip 14 forward. These motions will force the second end 154 of the drive shaft 150 to move in a clockwise direction when looking at the disk 110 on the side attached to the second end 154 of the drive shaft 150. The clockwise revolution of the second end 154 of the drive shaft 150 will cause the disk 110, and therefore the second rear wheel 60, to rotate in a clockwise direction, moving the exercise cycle 10 in a backward direction.

To steer the exercise cycle 10 while it is in motion, the user places her feet firmly on foot force plates 72 and 74 to move directionally together with the users' feet. The user points their toes in the direction that they want the exercise cycle 10 to move which turns the foot force plates 72 and 74, thereby turning the front wheel 40 relative to the frame 20 of the exercise cycle 10. The orientation of the front wheel 40 will determine the direction of the exercise cycle 10. Thus, a user steers the exercise cycle 10 with the user's feet by simply pointing their toes in the direction that they want the exercise cycle 10 to move in.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. An exercise cycle comprising:
    a cycle frame with a seat, the cycle frame having a frame centre line running from front to rear of the cycle;
    a front wheel and at least two rear wheels rotatably connected to the cycle frame;
    a force plate positioned below the seat and rotatably attached along its base to the cycle frame along the frame center line;
    two operator handles, each having an attachment end and a distal end, wherein the operator handles are connected at their attachment ends to opposing sides of the force plate so as to allow rotation of the force plate around its point of attachment to the cycle frame when the distal ends of the operator handles are moved; and
    a drive conversion device connecting the force plate to at least one of the rear wheels such that rotation of the force plate about its point of attachment to the cycle frame from the mechanical movement of the operator handles is converted to rotational force to turn said at least one rear wheel and drive the cycle forward.

2. The exercise cycle of claim 1 wherein the operator handles include a hand grip at their distal ends.

3. The exercise cycle of claim 1 wherein the operator handles are adjustable in length.

4. The exercise cycle of claim 3 wherein the operator handles comprise telescoping sections.

5. The exercise cycle of claim 1 wherein the spacing of the operator handles from the edges of the seat is adjustable.

6. The exercise cycle of claim 5 wherein the operator handles are pivotally attached to the opposing edges of the force plate at their attachment ends, and further comprising two pivot arms, each pivot arm being adjustable in length and pivotally attached at one end thereof to the force plate and at the other end thereof to one of the operator handles, whereby upon adjusting the length of the pivot arms, the spacing of the operator handles from the seat is adjusted.

7. The exercise cycle of claim 1 wherein the drive conversion device comprises a drive shaft pivotally connected at one end thereof to the force plate and pivotally connected at the opposite end thereof, being the drive end, to at least one of the rear wheels, whereby upon the forward and back motion of the point of attachment of the drive shaft to the force plate occasions by movement of the operator handles, the drive end of the drive shaft will exert a forward or backward force parallel to the direction of travel of the cycle upon the at least one rear wheel, resulting in movement of the cycle.

8. The exercise cycle of claim 7 wherein the drive end of the drive shaft is attached to a disk which is rotatably attached to the at least one rear wheel, wherein the force exerted upon the disk by movement of the drive shaft is translated to the at least one rear wheel.

9. The exercise cycle of claim 8 further comprising a clutch between the disk and the at least one rear wheel, whereby only drive force from the drive shaft in one direction, either forward or back in the direction of travel of the cycle, will be directly exerted upon the at least one rear wheel, and drive force from the drive shaft in an opposite direction will not be applied to the at least one rear wheel.

10. The exercise cycle of claim 7 wherein the length of the drive shaft is adjustable.

11. The exercise cycle of claim 7 wherein the point of attachment of the drive shaft to the force plate is adjustable, to allow for adjustment to the force or stroke of the drive shaft.

12. The exercise cycle of claim 1 wherein a foot force plate is provided.

13. The exercise cycle of claim 12 wherein the foot force plate is operably connected to the front wheel and is used to turn the front wheel relative to the cycle frame, thereby steering the exercise cycle.

14. The exercise cycle of claim 2 wherein the hand grips are fitted with aim cushions.

* * * * *